(12) United States Patent
Callahan et al.

(10) Patent No.: US 7,318,424 B2
(45) Date of Patent: Jan. 15, 2008

(54) INTEGRATED VAPOR MANAGEMENT AND ROLLOVER VALVE FOR A FUEL TANK

(75) Inventors: Douglas J. Callahan, Rochester Hills, MI (US); Juris Julijs Pruzinskis, Janesville, WI (US); Brent J Ertl, Darien, WI (US); Hans Henning Bishop, Royal Oak, MI (US)

(73) Assignee: Miniature Precision Components, Inc., Southfield, MI (US)

( * ) Notice: Subject to any disclaimer, the term of this patent is extended or adjusted under 35 U.S.C. 154(b) by 300 days.

(21) Appl. No.: 11/128,835

(22) Filed: May 14, 2005

(65) Prior Publication Data

US 2006/0254641 A1 Nov. 16, 2006

(51) Int. Cl.
*F02M 33/02* (2006.01)
*F02M 33/08* (2006.01)

(52) U.S. Cl. ...................... 123/518; 123/516

(58) Field of Classification Search ................ 123/518, 123/516, 517, 519, 520, 521; 137/41, 571, 137/572

See application file for complete search history.

(56) References Cited

U.S. PATENT DOCUMENTS

| | | | | |
|---|---|---|---|---|
| 4,279,233 A | * | 7/1981 | Tobita et al. | 123/519 |
| 4,852,892 A | * | 8/1989 | Reid | 280/834 |
| 4,919,103 A | * | 4/1990 | Ishiguro et al. | 123/514 |
| 5,197,443 A | * | 3/1993 | Hodgkins | 123/514 |
| 5,360,034 A | * | 11/1994 | Der Manuelian | 137/571 |
| 5,460,136 A | * | 10/1995 | Yamazaki et al. | 123/519 |
| 5,487,369 A | * | 1/1996 | Hara et al. | 123/520 |
| 5,592,922 A | * | 1/1997 | Denz | 123/520 |
| 5,718,209 A | * | 2/1998 | Scardino et al. | 123/519 |
| 6,367,457 B1 | * | 4/2002 | Mancini et al. | 123/516 |
| 6,463,889 B2 | * | 10/2002 | Reddy | 123/3 |
| 6,694,955 B1 | * | 2/2004 | Griffiths et al. | 123/516 |
| 6,792,966 B2 | * | 9/2004 | Harvey | 137/265 |
| 7,005,001 B2 | * | 2/2006 | Allen et al. | 96/149 |
| 2001/0035215 A1 | * | 11/2001 | Tipton et al. | 137/571 |
| 2006/0130816 A1 | * | 6/2006 | Mills | 123/519 |

OTHER PUBLICATIONS

Final Regulation Order: California Code of Regulations, Article 1, Chapter 15, Division 3, Title 13.

* cited by examiner

*Primary Examiner*—Mahmoud Gimie
(74) *Attorney, Agent, or Firm*—Dickinson Wright PLLC

(57) ABSTRACT

A fuel system comprising a fuel tank having an opening. A cap is removably coupled to the fuel tank and operable for sealingly closing the opening to prevent ingress and egress of air through the opening. An overfill chamber is in communication with the fuel tank, and a hydrocarbon collection chamber is in communication with the overfill chamber. A valve is disposed between the hydrocarbon collection chamber and the overfill chamber. The valve includes a reference axis and is configured to permit fluid communication between the overfill chamber and the hydrocarbon collection chamber only when an angle between a vertical axis and the reference axis is less than about thirty-five degrees.

22 Claims, 8 Drawing Sheets

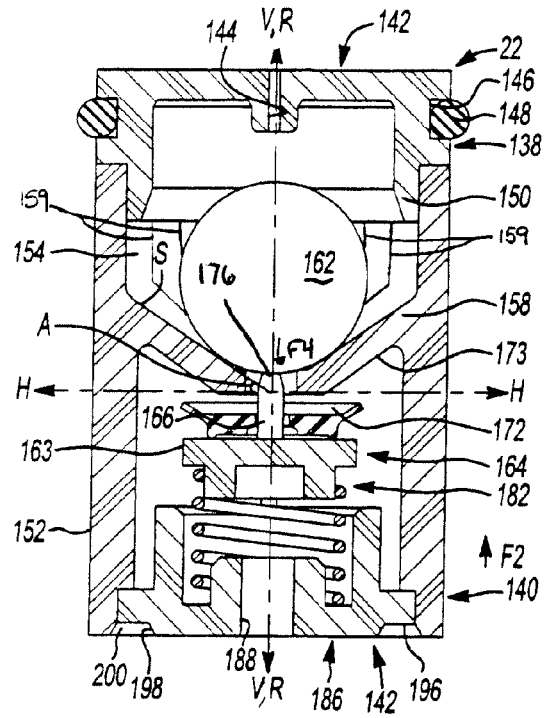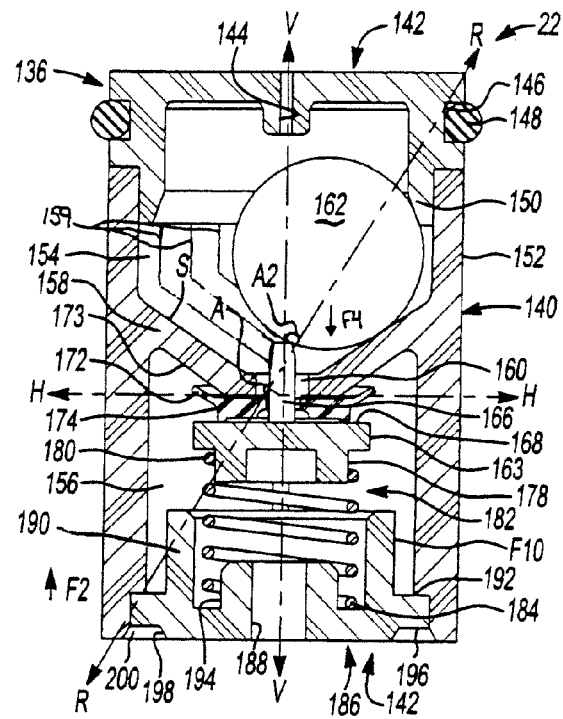
*Fig-2A*  *Fig-2B*
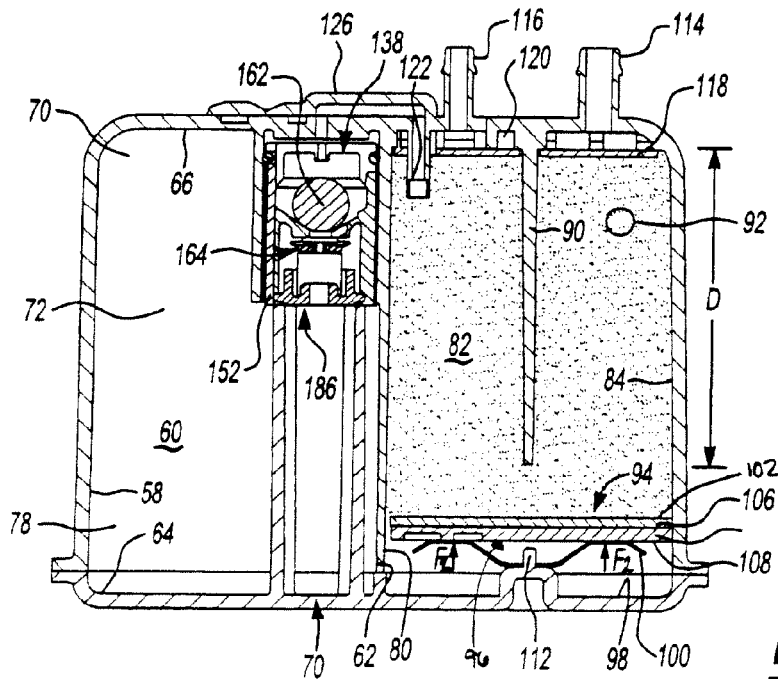
*Fig-3*

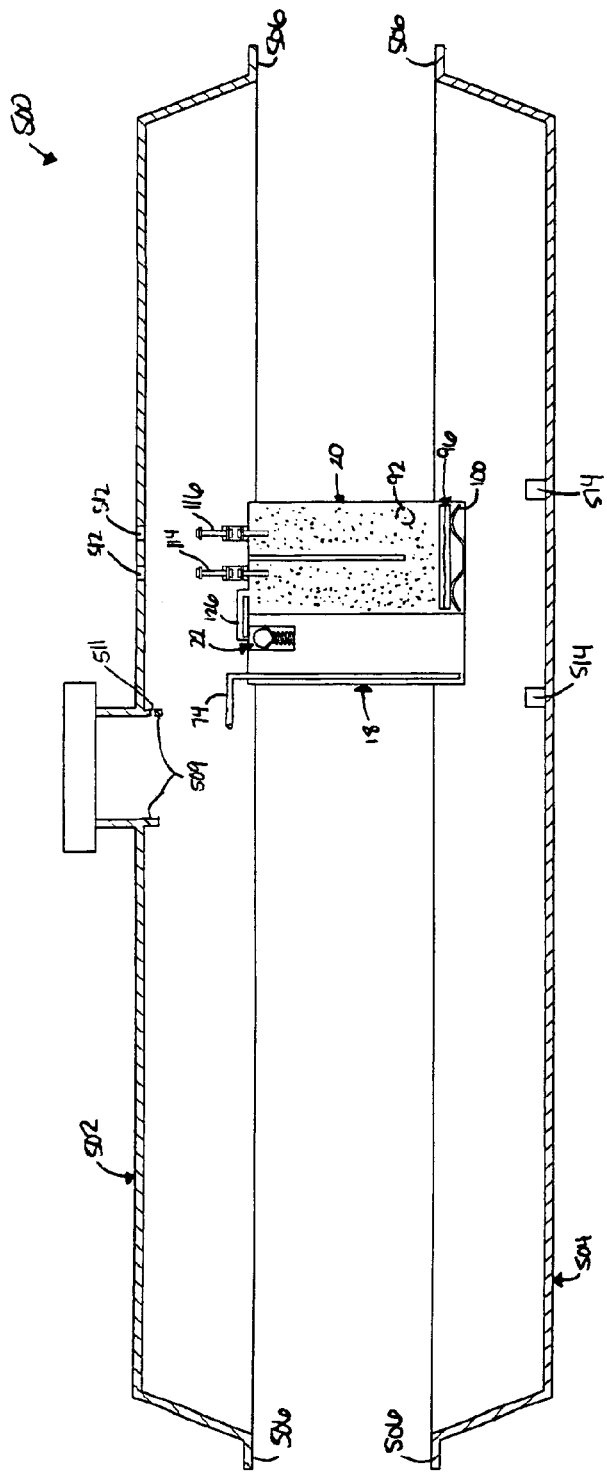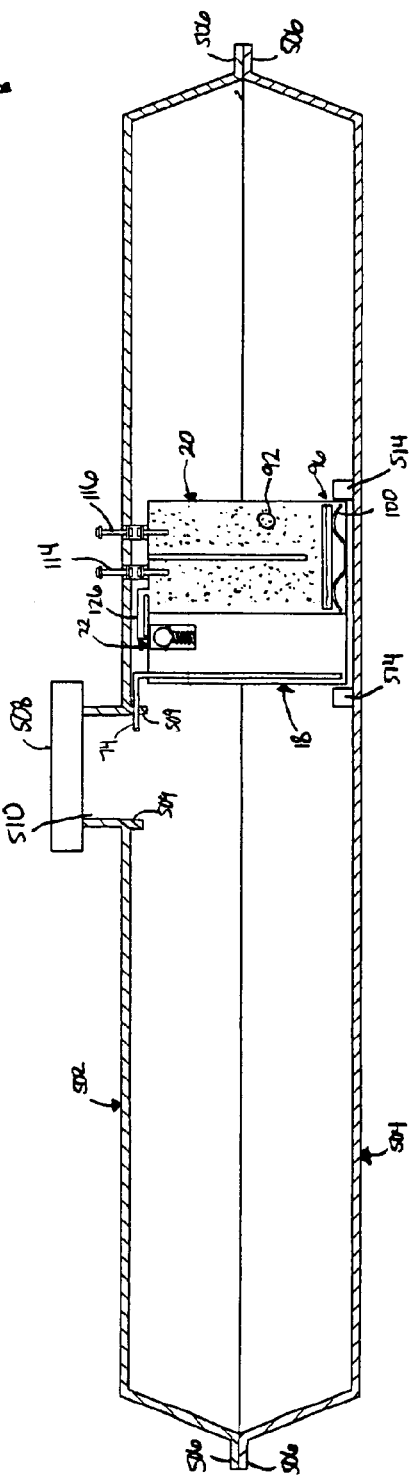

US 7,318,424 B2

INTEGRATED VAPOR MANAGEMENT AND ROLLOVER VALVE FOR A FUEL TANK

FIELD OF THE INVENTION

The present invention generally relates to fuel systems and more particularly to an integrated vapor management and rollover valve for a fuel tank.

BACKGROUND OF THE INVENTION

Modern lawn and garden equipment typically include fuel systems which are designed provide fuel to small engines under various operating conditions. For example, with respect to lawn tractors or lawn mowers, this equipment may be operated on steep inclines and grades. Portable backpack blowers may be positioned at different angles during use and storage. Further, portable generators may be tilted at various angles when being maneuvered. Thus, the fuel systems associated with small engines need to be able to contain the liquid fuel as the equipment is transported or operated at various angles.

In addition, regulatory agencies are seeking to continuously reduce exhaust and passive emissions, such as evaporative fuel emissions, from engines. Future emissions regulations will be more restrictive due to growing environmental concerns. Accordingly, it is desirable to provide a fuel system for use with a small engine with reduced emissions and the ability to operate at various orientations.

SUMMARY OF THE INVENTION

In one form, the present teachings provide a fuel system comprising a fuel tank having an opening. A cap is removably coupled to the fuel tank and operable for sealingly closing the opening to prevent ingress and egress of air through the opening. An overfill chamber is in communication with the fuel tank, and a hydrocarbon collection chamber is in communication with the overfill chamber. A valve is disposed between the hydrocarbon collection chamber and the overfill chamber. The valve includes a reference axis and is configured to permit fluid communication between the overfill chamber and the hydrocarbon collection chamber only when an angle between a vertical axis and the reference axis is less than about thirty-five degrees.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein:

FIG. 2A is a detailed cross sectional view of the rollover valve in a first, open position;

FIG. 2B is a detailed cross sectional view of the rollover valve in a second, closed position;

FIG. 3 is a cross-sectional view of the fuel tank taken along line 3-3 of FIG. 1;

FIG. 8 is an exploded environmental view of a third application employing the integrated vapor management system and rollover valve of the present invention according to various embodiments;

FIG. 9 is an assembled view of the environmental view of the third application of FIG. 8.

DETAILED DESCRIPTION OF VARIOUS EMBODIMENTS

The following description of various embodiments is merely exemplary in nature and is in no way intended to limit the invention, its application, or uses. The following description is related generally to an integrated vapor management and rollover valve for a fuel system for use with relatively small displacement off-highway spark-ignited internal combustion engines with an output of less than about nineteen kilowatts (about 25 horsepower). These small engines may be employed in various applications, such as portable equipment including lawn and garden equipment or portable generators, however, it will be understood that the integrated vapor management and rollover valve, as described and claimed herein, can be used with any appropriate fuel system. Therefore, it will be understood that the following discussions are not intended to limit the scope of the appended claims.

Figure 1:
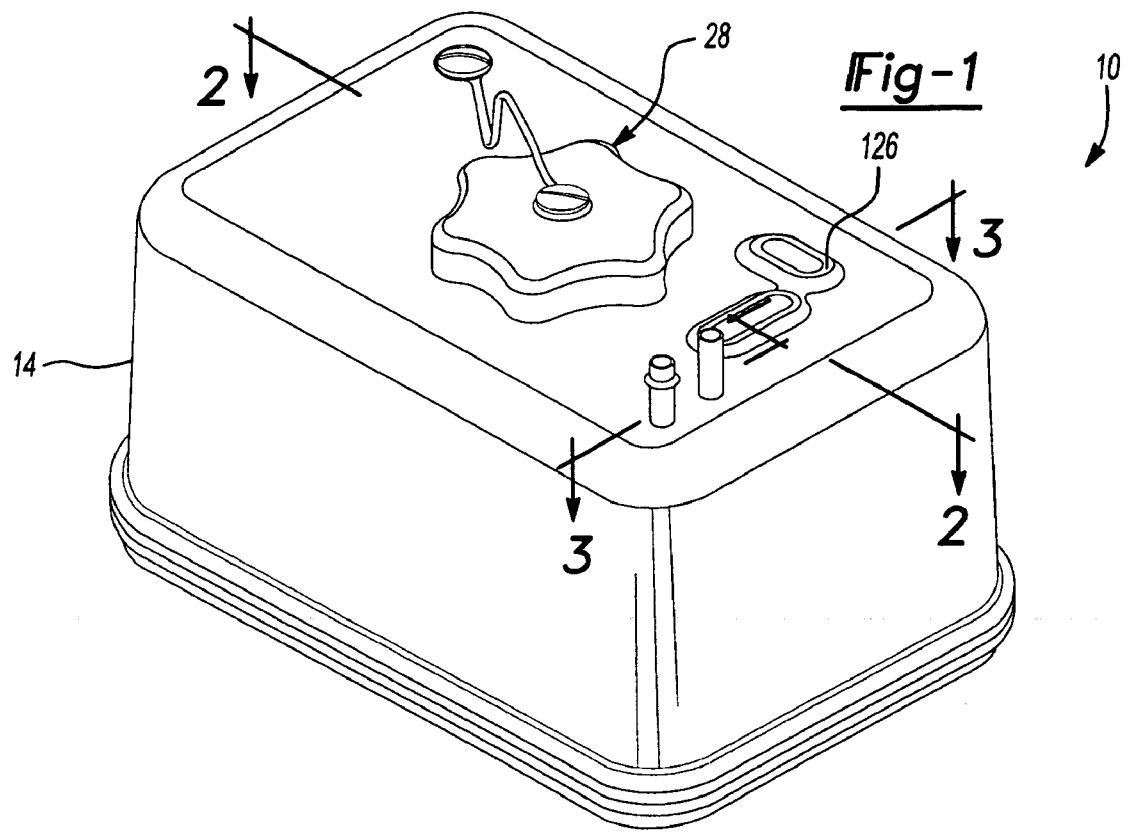
FIG. 1 is a perspective view of a fuel tank including an integrated vapor management system and a rollover valve constructed in accordance with the teachings of the present invention.
Figure 5:
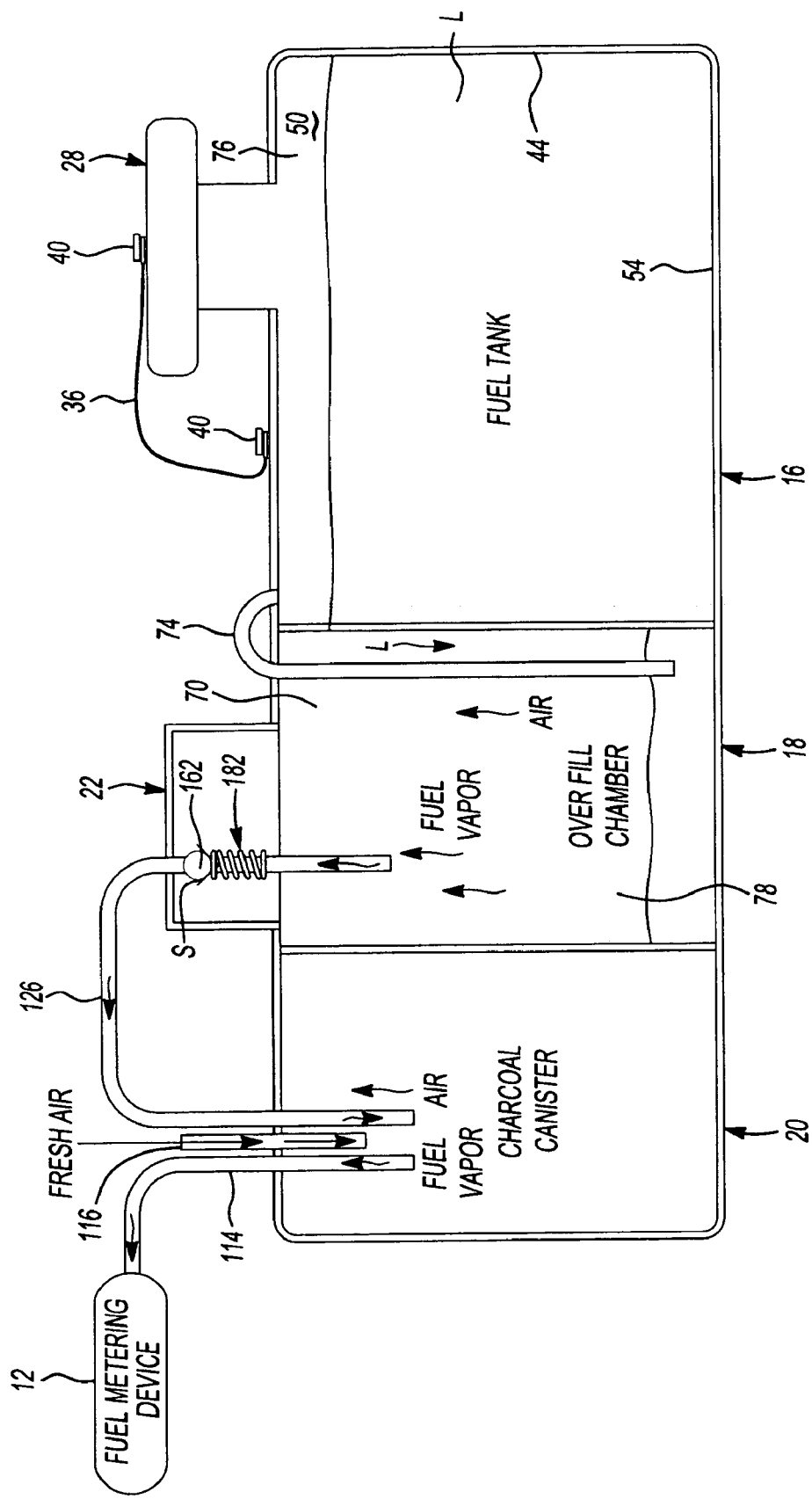
FIG. 5 is a simplified schematic illustration of the operation of the integrated vapor management system and rollover valve in a fuel tank in accordance with the teachings of the present invention.
Figure 6:
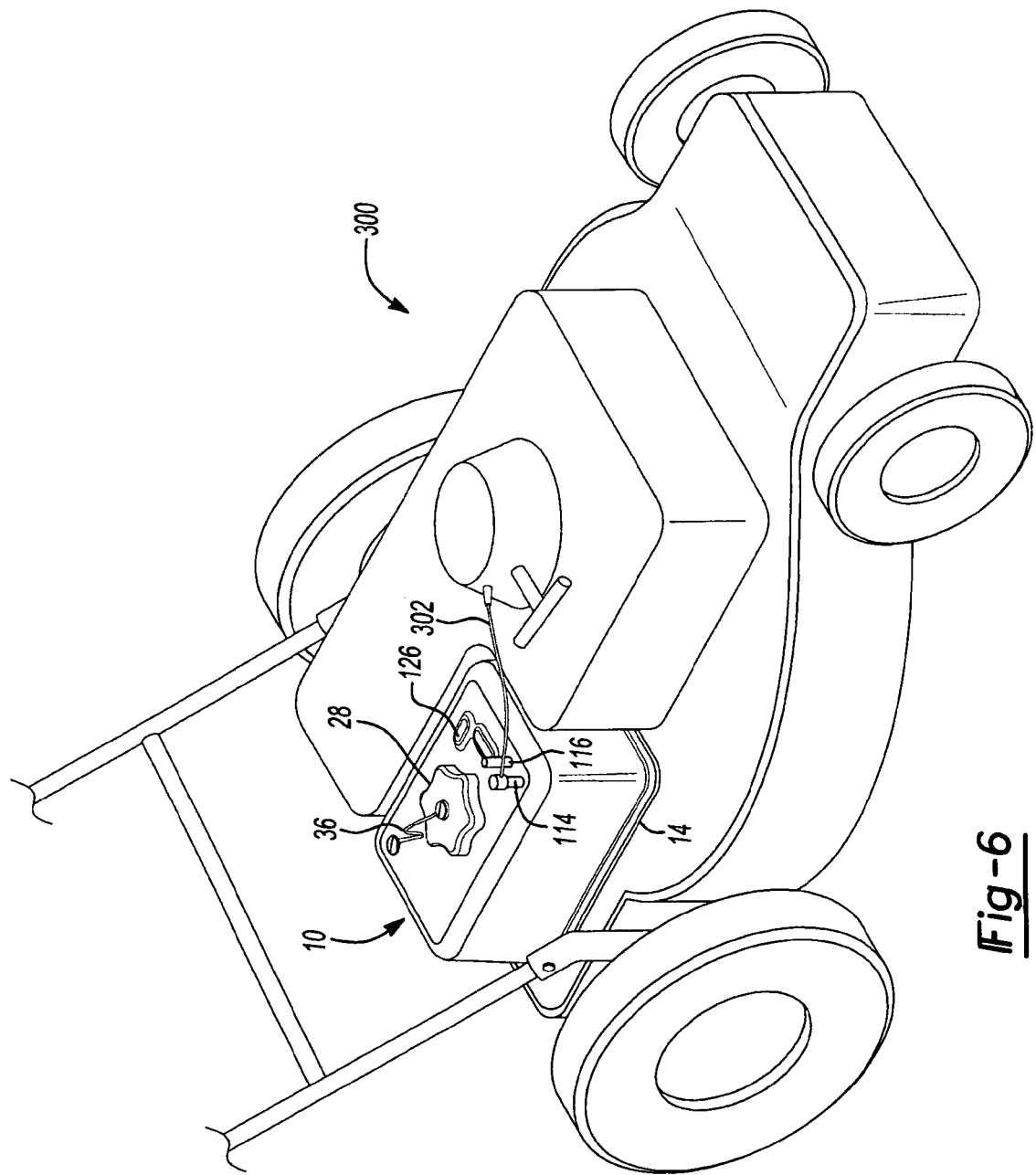
FIG. 6 is an environmental view of an application employing the fuel tank according to various embodiments.

With reference to FIGS. 1 and 6 of the drawings, a fuel system 10 constructed in accordance with the teachings of the present invention is shown. The fuel system 10 may be operable to provide fuel to a fuel metering device 12, such as a carburetor, while maintaining emissions levels at or below a predetermined emission rate, such as about 2.5 grams of reactive organic gas per square meter of the area of the fuel tank per day. With additional reference to FIGS. 2, 2A, 2B, 3, 4 and 5, the fuel system 10 is a closed loop system and can include a housing 14 including a fuel tank 16 in communication with an overfill chamber 18. Although the fuel system 10 is shown as being contained within the housing 14, it will be understood that each of the components described herein could be individually packaged as a complete fuel system 10. The overfill chamber 18 can also be in communication with a hydrocarbon collection chamber 20 through a rollover valve or valve assembly 22.

The fuel tank 16 can include a chamber 24 for receipt of a liquid fuel L to enter through an opening 26. The cap 28 can be selectively coupled to the fuel tank 16 to sealingly close the opening 26. The cap 28 may be releasably secured to the fuel tank 16 through a cam lock mechanism comprising a first cam lock 30 formed on the housing 14 and through a mating cam lock 32 formed on the cap 28, however, any suitable positive stop locking system could be employed.

The cap 28 can prevent the ingress and egress of gaseous fluids, such as air or fuel vapors (not specifically shown). The cap 28 may also include a seal 34 to further protect against the exchange of gaseous fluids between the interior of the fuel tank 16 and the atmosphere. A tether strap 36 may be coupled to the cap 28. The tether strap 36 can include a pair of loops 38 to mate with a pair of protrusions 40. One of the pair of protrusions 40 may be formed on the housing 14 and another one of the pair of protrusions 40 may be formed on the cap 28 to further couple the cap 28 to the housing 14. The chamber 24 can further include a sleeve 42 disposed in the opening 26. The sleeve 42 can be integrally formed (e.g., molded) with a portion of the housing and can act as an air trap to prevent a user from over-filling the chamber 24 with a liquid fuel L.

Figure 2:
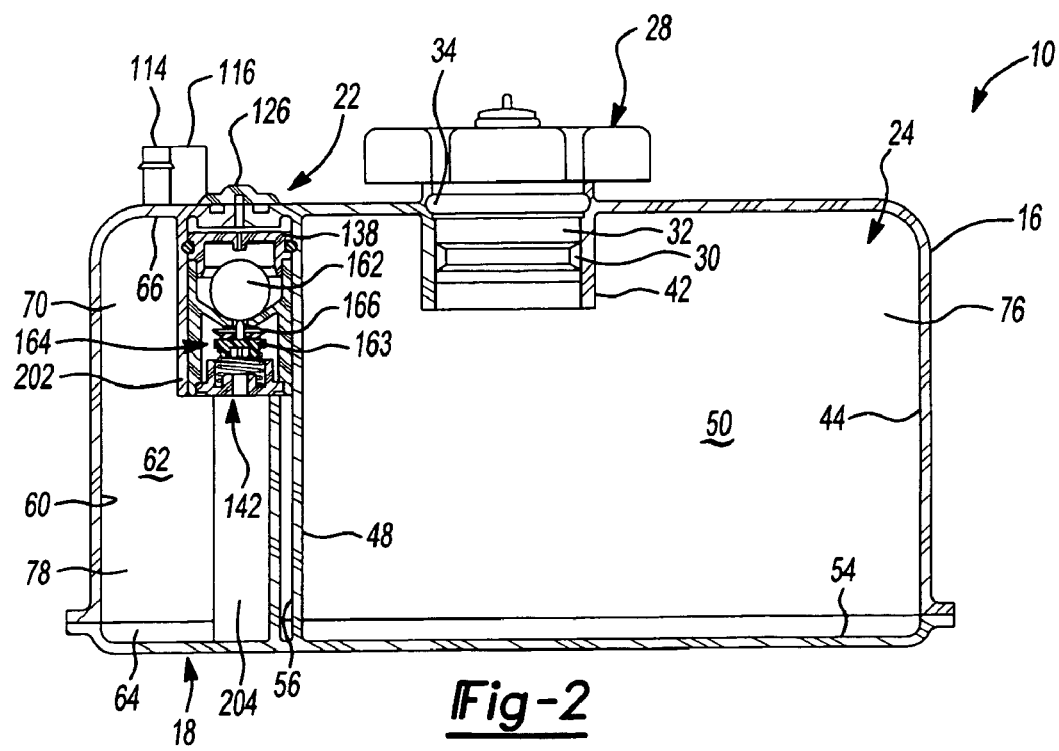
FIG. 2 is a side, cross-sectional view of the fuel tank taken along line 2-2 of FIG. 1.
Figure 4:
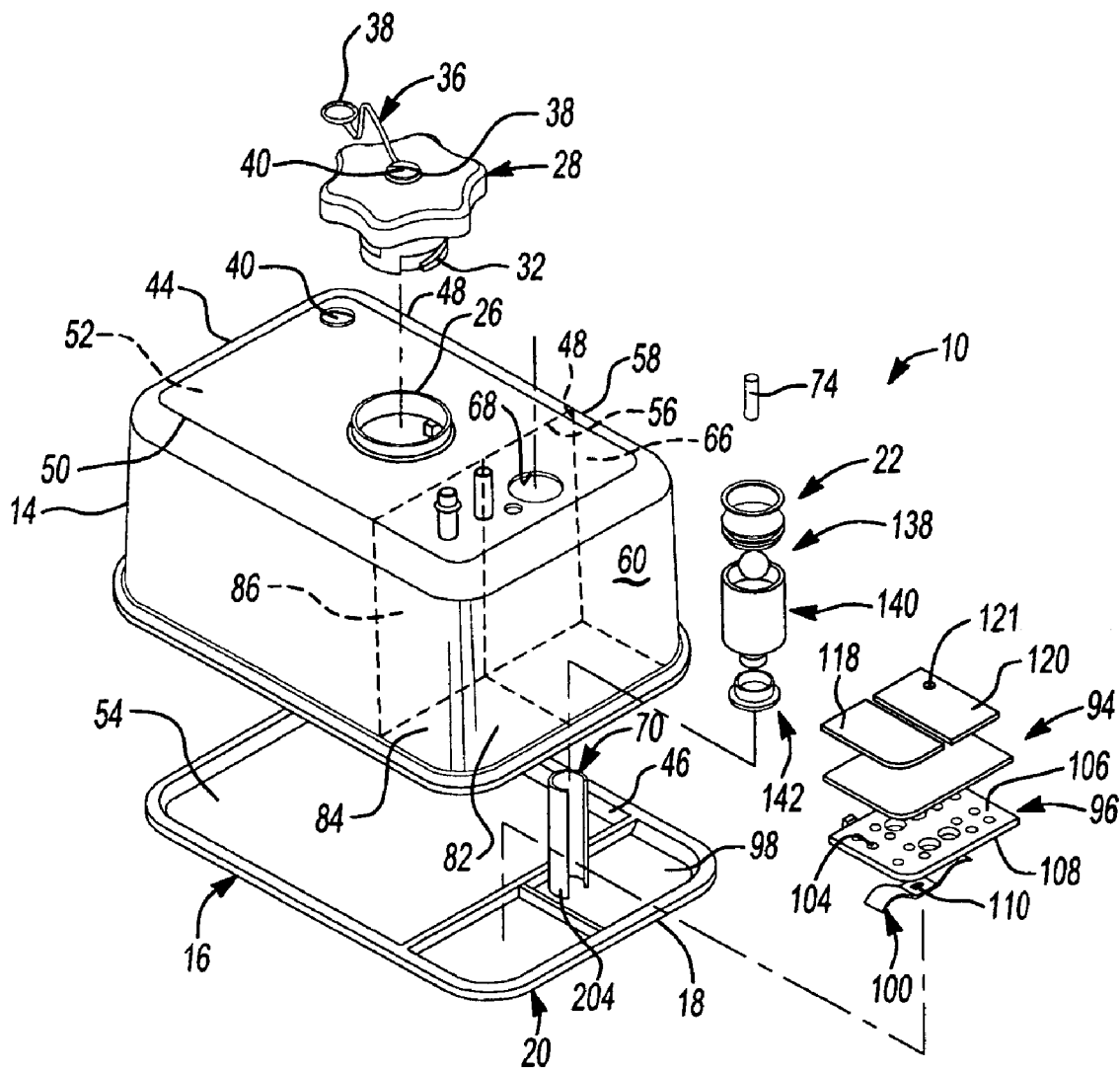
FIG. 4 is an exploded view of the fuel tank.

As best shown in FIGS. 2 and 4, the chamber 24 may be defined by one or more walls, such as a first sidewall 44, a second sidewall 46, a third sidewall 48 and a fourth sidewall 50 disposed between a top wall 52 and a base 54. The first sidewall 44, second sidewall 46, third sidewall 48, fourth sidewall 50, top wall 52 and base 54 may each be formed of any suitable material with a desired impact resistance and/or permeation resistance, such as a permeation resistance of less than 2.5 grams per square meter per day, and may generally be formed of a polymeric material, such as ZYTEL® nylon resin manufactured by DuPont or VYDYNE® nylon resin manufactured by Solutia, however, metallic materials, including metallic foils, may also be employed in whole or in part to form the sidewalls. The fuel tank 16 is generally sized to accommodate the liquid fuel L required to power the fuel metering device 12 for a pre-selected period of time. For example, a 0.25 gallon tank may be employed with a lawn mower, as shown in FIG. 6. With reference back to FIGS. 2 and 4, the first sidewall 44, second sidewall 46, third sidewall 48 and fourth sidewall 50 may be integrally formed with the top wall 52 and base 54, however, these may each be fixedly attached to the base 54 through any suitable process, such as adhesives or welding, depending upon the selected material. The third sidewall 48 may form a first sidewall 56 of the overfill chamber 18.

As best shown in FIGS. 2 and 3, the overfill chamber 18 may include the first sidewall 56 which may be integrally formed with the third sidewall 48, or in the alternative, may be displaced adjacent to the third sidewall 48 of the fuel tank 16. The overfill chamber 18 may also include a second sidewall 58, a third sidewall 60 and a fourth sidewall 62, each coupled to a base 64 and a top wall 66. The first sidewall 56, second sidewall 58, third sidewall 60, fourth sidewall 62, top wall 66 and base 64 may each be formed of any suitable material with a desired impact resistance and/or permeation resistance, such as a permeation resistance of less than 2.5 grams per square meter per day, and may generally be formed of a polymeric material, such as ZYTEL® nylon resin manufactured by DuPont or VYDYNE® nylon resin manufactured by Solutia, however, metallic materials including metallic foils may also be employed to wholly or partially form the sidewalls of the overfill chamber 18. The first sidewall 56, second sidewall 58, third sidewall 60 and fourth sidewall 62 may be integrally formed with the base 64 and top wall 66 or may be fixedly attached to the base 64 and top wall 66 through welding or adhesives depending upon the material selected. Additionally, the second sidewall 58 may be integrally formed with the second sidewall 46 of the fuel tank 16 or may be adjacent to the second sidewall 46, and the top wall 66 may be integrally formed with or adjacent to the top wall 52 of the fuel tank 16.

The top wall 66 of the overfill chamber 18 may define an opening 68 that can be coupled to a sleeve assembly 70 for receipt of the valve assembly 22 therein. The sleeve assembly 70 can be configured to retain the valve assembly 22 in a top portion 72 of the overfill chamber 18, as will be discussed in greater detail below. The overfill chamber 18 may also include a fuel expansion tube 74, as best shown in FIG. 5. The fuel expansion tube 74 may be comprised of a polymeric material, such as ULTRAMID® 8350 nylon resin manufactured by BASF or a polyvinyl chloride polymeric material. The fuel expansion tube 74 can serve to enable a top portion 76 of the fuel tank 16 to communicate with a bottom portion 78 of the overfill chamber 18. When the temperature of the liquid fuel L in the fuel tank 16 increases, the fuel expansion tube 74 permits the expanding liquid fuel L to enter the overfill chamber 18. The fuel expansion tube 74 also permits the liquid fuel L to enter the overfill chamber 18 when the housing 14 may be jostled or tilted. Thus, the overfill chamber 18 is sized to accommodate at least the amount of liquid fuel L which would be displaced if the fuel tank 16 was full of liquid fuel L and tilted an angle less than thirty-five degrees, to prevent liquid fuel L from entering the hydrocarbon collection chamber 20, as will be described in greater detail below. Hence, the size of the overfill chamber 18 also depends upon the coefficient of thermal expansion of the liquid fuel L. Due to the nature of the closed loop system, the fuel expansion tube 74 acts as a natural siphon to transmit air, fuel vapors and the liquid fuel L between the overfill chamber 18 and the fuel tank 16 when the liquid fuel L is being removed from the fuel tank 16 for use in the fuel metering device 12, or when the temperature of the liquid fuel L has decreased.

The hydrocarbon collection chamber 20 is in fluid communication with the overfill chamber 18 for transmitting air and fuel vapors. The hydrocarbon collection chamber 20 generally includes a first sidewall 80, a second sidewall 82, a third sidewall 84 and a fourth sidewall 86, each of which may be coupled to a top wall 88, as best shown in FIGS. 3 and 4. The first sidewall 80, second sidewall 82, third sidewall 84, fourth sidewall 86, and top wall 88 may each be formed of any suitable material with a desired impact resistance and/or permeation resistance, such as a permeation resistance of less than 2.5 grams per square meter per day, and may generally be formed of a polymeric material, such as ZYTEL® nylon resin manufactured by DuPont or VYDYNE® nylon resin manufactured by Solutia, however, metallic materials, including metallic foils may also be employed in whole or in part to form the sidewalls of the hydrocarbon collection chamber 20. The first sidewall 80, second sidewall 82, third sidewall 84 and fourth sidewall 86 may be integrally formed with the top wall 88 or may be fixedly attached to the top wall 88 through welding or adhesives depending upon the material employed.

The first sidewall 80 may be integrally formed with the fourth sidewall 62 of the overfill chamber 18 or may be displaced adjacent to the fourth sidewall 62. Similarly, the second sidewall 82 may be integrally formed with or adjacent to the third sidewall 60 of the overfill chamber 18 and the third sidewall 84 may be integrally formed with or adjacent to the fourth sidewall 50 of the fuel tank 16. The top wall 88 may be integrally formed with the top wall 66 of the overfill chamber 18 and/or the top wall 52 of the fuel tank 16, or the top wall 88 may be adjacent to the top walls 66, 52. The top wall 88 may also include a formed projection 90 which extends a distance D into the hydrocarbon collection chamber 20 to provide a pathway for the air and fuel vapors which maximizes the contact of the air and fuel vapors with a hydrocarbon collection material 92 disposed within the hydrocarbon collection chamber 20, as will be discussed in greater detail below. The hydrocarbon collection material 92 may be comprised of any suitable compound able to absorb hydrocarbons, such as 1100 series granulated charcoal produced by MeadWestvaco of Stamford, Conn. In one embodiment, for example, about one hundred cubic centimeters of granulated charcoal may be employed to remove hydrocarbons associated with a one gallon fuel tank 16, and 1,200 cubic centimeters of granulated charcoal may be employed for a ten gallon fuel tank 16.

The hydrocarbon collection chamber 20 can further include a pressurized base system 94. The pressurized base system 94 can include a platform 96 that can be disposed below a base 98 and which can be responsive to a spring 100, such as a leaf spring, and a filter 102. The pressurized base system 94 can apply a load to the hydrocarbon collection material 92 retained within the hydrocarbon collection chamber 20 to reduce or eliminate the presence of relatively large voids within hydrocarbon collection material 92. Accordingly, the pressurized base system 94 promotes the passage of air and fuel vapors pass through the hydrocarbon collection material 92 rather than through a flow path around the hydrocarbon collection material 92 that could form over time. The platform 96 may generally be comprised of a polymeric material, such as nylon, and can be configured to slideably engage the first sidewall 80, second sidewall 82, third sidewall 84, and fourth sidewall 86. A plurality of openings 104 may be defined in the platform 96 to reduce the weight of the platform 96. The platform 96 includes a first surface 106 and a second surface 108. The first surface 106 contacts the leaf spring 100 for receipt of a force F from the leaf spring 100.

The leaf spring 100 can be generally disposed between the first surface 106 of the platform 96 and the base 98. Typically, the leaf spring 100 can be secured to the base 98 via an opening 110 formed on the leaf spring 100 which mates with a protrusion 112 formed on the base 98. The leaf spring 100 may be comprised of any appropriate material, such as a stainless steel. The leaf spring 100 serves to provide the force F to the platform 96 to compress the hydrocarbon collection material 92, to keep the hydrocarbon collection material 92 relatively free of large voids over the life of the hydrocarbon collection chamber 20.

The second surface 108 of the platform 96 may be adjacent to the filter 102 to apply the force F from the leaf spring 100 to the filter 102. The filter 102 may be comprised of a polyester blend or any medium suitable to retain the hydrocarbon material within the hydrocarbon collection chamber 20.

The top wall 88 of the hydrocarbon collection chamber 20 may also include a first port 114 and a second port 116. The first port 114 may be disposed adjacent to a second filter 118 to enable fuel vapors to pass through the first port 114 while preventing the hydrocarbon collection material 92 from exiting through the first port 114. The first port 114 may be coupled to the fuel metering device 12 via a fuel vapor discharge line 302 secured to the first port 114, as best shown in FIG. 6. With reference back to FIGS. 3 and 4, the second port 116 may be disposed adjacent to a filter 120 to enable fresh air to enter the hydrocarbon collection chamber 20, but to prevent the release of the hydrocarbon collection material 92 into the atmosphere. The filter 120 can further include an opening 121 to enable an inner port 122 to pass through the filter 120. The inner port 122 can permit the fuel vapor from the first port 114 and the fresh air from the second port 116 to each pass through the hydrocarbon collection chamber 20 into the valve assembly 22.

A conduit 126 can couple the inner port 122 of the hydrocarbon collection chamber 20 to the valve assembly 22. The conduit 126 can be formed of a polymeric material, such as such as ZYTEL® nylon resin manufactured by DuPont or VYDYNE® nylon resin manufactured by Solutia. The conduit 126 may be secured to the overfill chamber 18 and hydrocarbon collection chamber 20 through welding, such as hot plate welding or vibration welding, however, other mechanisms could be used to secure the conduit 126 to the overfill chamber 18 and the hydrocarbon collection chamber 20, such as adhesives.

As best shown in FIGS. 2A and 2B, the valve assembly 22 can be in fluid communication with the hydrocarbon collection chamber 20 and the overfill chamber 18 via the conduit 126. The valve assembly 22 may be generally annular and can include a first orifice assembly 136 and a second orifice assembly 138 that can be separated by a valve body 140. The first orifice assembly 136 can include a cap 142 that can define an opening 144 to enable a gaseous fluid, such as air or fuel vapor, to enter or exit the hydrocarbon collection chamber 20. The cap 142 can further include an exterior groove 146 for receipt of a seal 148 to secure the valve assembly 22 within the sleeve assembly 70 of the overfill chamber 18, as will be discussed in greater detail below. The cap 142 can also include a lip 150 to couple the first orifice assembly 136 to the valve body 140.

The valve body 140 can include a cylindrical housing 152. The diameter of the valve body 140 can be generally slightly larger than a diameter of the cap 142 of the first orifice assembly 136 to secure the first orifice assembly 136 to the cylindrical housing 152. The cylindrical housing 152 can include an upper portion 154 and a lower portion 156. The upper portion 154 can include a lip 158 defining a central opening 160. The lip 158 can have a conical-shaped sloped surface S which generally forms an angle A with respect to a horizontal axis H of between about ten degrees to about thirty-five degrees. The sloped surface S may include lateral striations 159 to provide flow passages for the air and fuel vapors. A ball 162 can be disposed over the central opening 160 when an angle A2 between a reference axis R of the valve assembly 22 and a vertical axis V is about zero degrees, as will be described in greater detail below. The ball 162 may be composed of a metallic material, such as brass. In one embodiment, the ball 162 has a diameter of about 0.5 inches, and a mass of about ten grams.

The lower portion 156 of the valve body 140 may include a plunger 164. The plunger 164 can include a base 163 and a stem 166, each of which may be formed of a polymeric material. The base 163 of the plunger 164 may be generally circular, with a first surface 168 and a second surface 170. The first surface 166 may include a seal 172 to prevent the transmission of the liquid fuel L, air and fuel vapors into the hydrocarbon collection chamber 20 when the seal 172 is compressed against a second surface 170 of the lip 158. Thus, if the fuel tank 16 is tilted at an angle greater than thirty-five degrees, the fuel system 10 will prevent the flow of fuel vapors, air and liquid fuel L into the hydrocarbon collection chamber 20, thereby vapor-locking the fuel system 10. The vapor-locking of the fuel system 10 may prevent damage to the equipment employing the fuel system 10. The stem 166 may be formed on the first surface 168. The stem 166 may be integrally formed with the base 163, or may be coupled to the base 163 through press fitting, adhesives or the like. The stem 166 may be formed of a polymeric material and may include a semi-circular dimple 176 to mate with the ball 162.

The second surface 170 may include an annular protrusion 178 to engage a first end 180 of a spring 182. The diameter of the annular protrusion 178 is generally slightly smaller than a diameter of the spring 182 to secure the spring 182 to the base 163. The spring 182 may be a coil spring formed of a metallic material, such as stainless steel, with a spring force F2 generally equivalent to a force required to move the plunger 164 against the second surface 170 of the lip 158 when the angle A of the valve assembly 22 reaches a pre-selected amount, as will be discussed below. A second end 184 of the spring 182 may be coupled to the second orifice assembly 138.

The second orifice assembly 138 may include a cap 186 with a central opening 188 and a circular flange 190 extending from a first surface 192. The first surface 192 may also include a groove 194 for receipt of the second end 184 of the spring 182. The cap 186 may be formed of a polymeric material, and has a diameter which is generally larger than the diameter of the valve body 140 to secure the second orifice assembly 138 to the valve body 140. A second surface 196 may include a lip 198 for receipt of a second seal 200. The second seal 200 further assists in securing the valve assembly 22 in the sleeve assembly 70.

The valve assembly 22 may be disposed in the sleeve assembly 70 of the overfill chamber 18. The sleeve assembly 70 generally includes an annular housing 202 and a semi-circular sleeve 204 coupled to the base 64 of the overfill chamber 18. The annular housing 202 is sized such that the valve assembly 22 is capable of being press-fit into the annular housing 202. Press-fitting the valve assembly 22 into the annular housing 202 further ensures that no fluids exit the overfill chamber 18. The semi-circular sleeve 204 acts as a locating feature to ensure the valve assembly 22 is press-fit into the proper position.

Figure 7:
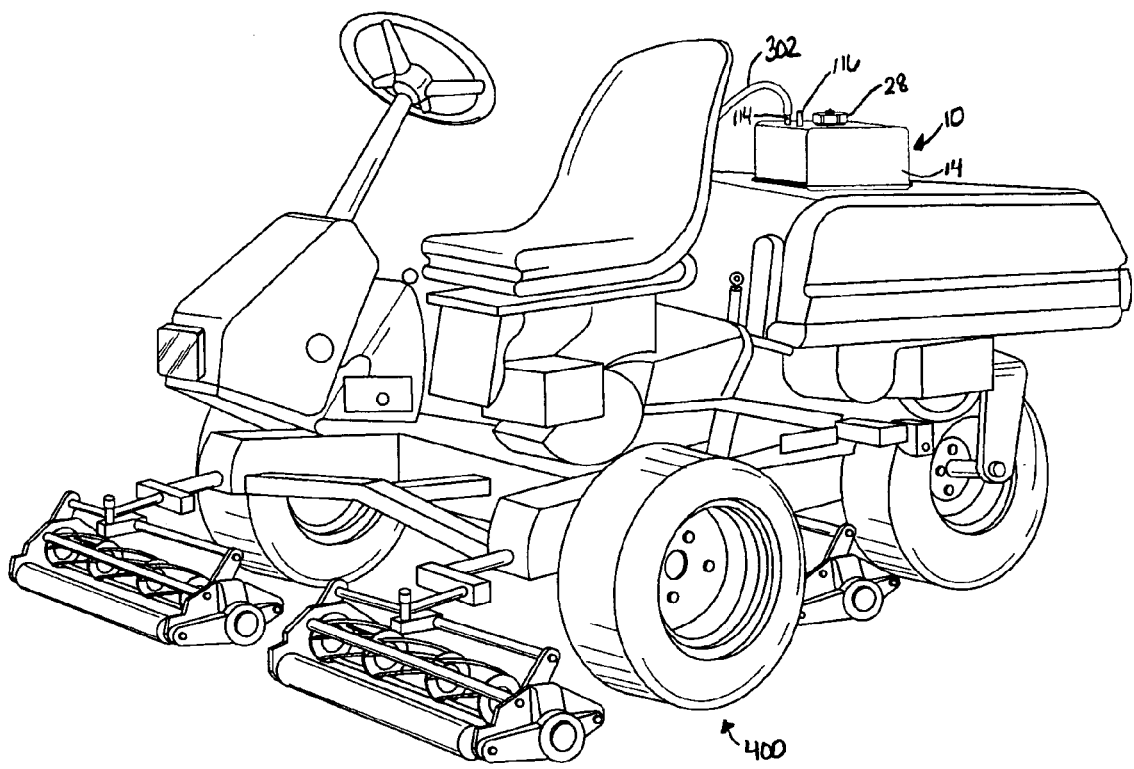
FIG. 7 is an environmental view of a second application employing the fuel tank according to various embodiments.

With continuing reference to FIGS. 1 through 4 and additional reference to FIGS. 5, 6 and 7, after the liquid fuel L enters the opening 26 of the fuel tank 16, the liquid fuel L will generally begin to evaporate to form fuel vapors. These fuel vapors are may be used by the fuel metering device 12 as a secondary fuel supply to power a piece of equipment, such as a lawn mower 300 (as shown in FIG. 6) or a lawn tractor 400 (as shown in FIG. 7). When the fuel metering device 12 is operational, the fuel metering device 12 will draw liquid fuel L from the fuel tank 16 as a primary source of fuel (not specifically shown). This causes air to be drawn into the fuel tank 16 to replace the liquid fuel L that is being drawn off by the fuel metering device 12, as will be discussed in greater detail below. The fuel vapors, acting as a secondary source of fuel, may enter into the fuel metering device 12 through the fuel vapor discharge line 302 in communication with the first port 114.

As the fuel vapors flow from the hydrocarbon collection chamber 20 from the first port 114, additional fuel vapors may flow from the fuel tank 16 through the fuel expansion tube 74 and through the central opening 188 of the second orifice assembly 138, when the valve assembly 22 is in the open position, as shown in FIG. 2A. The fuel vapors will flow around the stem 166 and be guided via the lateral striations 159 around the ball 162 and exit the valve assembly 22 through the central opening 160 of the first orifice assembly 136. Next, the fuel vapors flow through the conduit 126 into the hydrocarbon collection chamber 20 and enter the hydrocarbon collection chamber 20 via the inner port 122. These fuel vapors may then flow around the projection 90 of the hydrocarbon collection chamber 20 before exiting through the first port 114. It will be understood that although the projection 90 is shown to extend substantially a length of the hydrocarbon collection chamber 20, the length of the projection 90 may be modified as necessary to achieve a desired flow rate and flow path for the fuel vapors and fresh air.

Simultaneously, as fuel vapors are pulled into the fuel metering device 12, air is pulled into the hydrocarbon collection chamber 20 from the second port 116. The air flows around the projection 90 of the hydrocarbon collection chamber 20 and enters the inner port 122. The air may then flow through the conduit 126 and enter the central opening 160 via the lateral striations 159 of the first orifice assembly 136 of the valve assembly 22 before flowing around the stem 166 and exiting the valve assembly 22 through the central opening 188 of the second orifice assembly 138. The air may then flow through the fuel expansion tube 74 and into the fuel tank 16 to replace the liquid fuel L that is drawn off by the fuel metering device 12.

If, during operation, the fuel system 10 is rapidly jostled or titled in an amount that exceeds a predetermined tilt threshold, the valve assembly 22 will prevent the flow of the liquid fuel L, air and fuel vapors into the hydrocarbon collection chamber 20. With particular reference to FIG. 2B, the angle A formed by the sloped surface S is such that when the fuel system 10 is tilted, the ball 162 will roll on the sloped surface S, effectively reducing a force F4 on the stem 166 from the ball 162. Thus, as an angle A2 between a reference axis R and a vertical axis V increases, the ball 162 rolls further off the stem 166. Thus, force F4 becomes reduced, and eventually the force F2 of the spring 182 will cause the plunger 164 to rise towards the central opening 160 formed in the lip 158, until the seal 172 is disposed against the second surface 170 of the lip 158, which prevents the liquid fuel L, air and fuel vapors from entering the valve assembly 22. Thus, the valve assembly protects the hydrocarbon collection chamber 20 from contamination by the liquid fuel L. The angle A of the sloped surface S is generally equivalent to the angle of tilt the fuel system 10 can undergo before the liquid fuel L would enter the valve assembly 22. Typically, the angle A of the sloped surface S is between about twenty-five to about thirty-five degrees.

With reference now to FIGS. 8 and 9, an alternative tank 500 is shown employing the overfill chamber 18, hydrocarbon collection chamber 20 and valve assembly 22, shown in simplified form, but described in great detail above. The alternative tank 500 may be employed in various applications, including portable generators. The alternative tank 500 includes a first half 502 and a second half 504. Both the first half 502 and second half 504 are generally clam shaped, and include a lip 506 to enable the first half 502 to be fixedly attached to the second half 504. The first half 502 includes a cap 508 which may sealingly engage an opening 510. The first half 502 may further include a sleeve 509 disposed in the opening 510. The sleeve 509 can be integrally formed (e.g., molded) with a portion of the housing and can act as an air trap to prevent a user from over-filling the tank 500 with the liquid fuel L. The sleeve 509 may define an opening 511 for receipt of the fuel expansion tube 74 from the overfill chamber 18. The first half 502 may further define a plurality of openings 512 to enable the first port 114 and second port 116 to pass therethrough.

The second half 504 includes a slot 514 which may be configured to engage the overfill chamber 18, hydrocarbon collection chamber 20 and valve assembly 22 to secure the overfill chamber 18, hydrocarbon collection chamber 20 and valve assembly 22 within the tank 500. The slot 514 may be formed in the second half 504 or may be fixedly coupled to the second half 504, through the use of adhesives, welding or other techniques. Alternatively, the overfill chamber 18, hydrocarbon collection chamber 20 and valve assembly 22 may be secured to the tank individually though welding, adhesives or other techniques.

The overfill chamber 18, hydrocarbon collection chamber 20 and valve assembly 22 according to various embodiments of the present invention may be secured in the slot 514 of the tank 500 prior to the assembly of the tank 500, as shown in FIG. 8. Next, the first half 502 may be placed over the second half 504, such that the first port 114 and second port 116 align, and then the first half 502 may be sealed to the second half 504, as shown in FIG. 9. The first half 502 may be sealed to the second half 504 through any appropriate technique, such as welding or adhesives.

Figure 10:
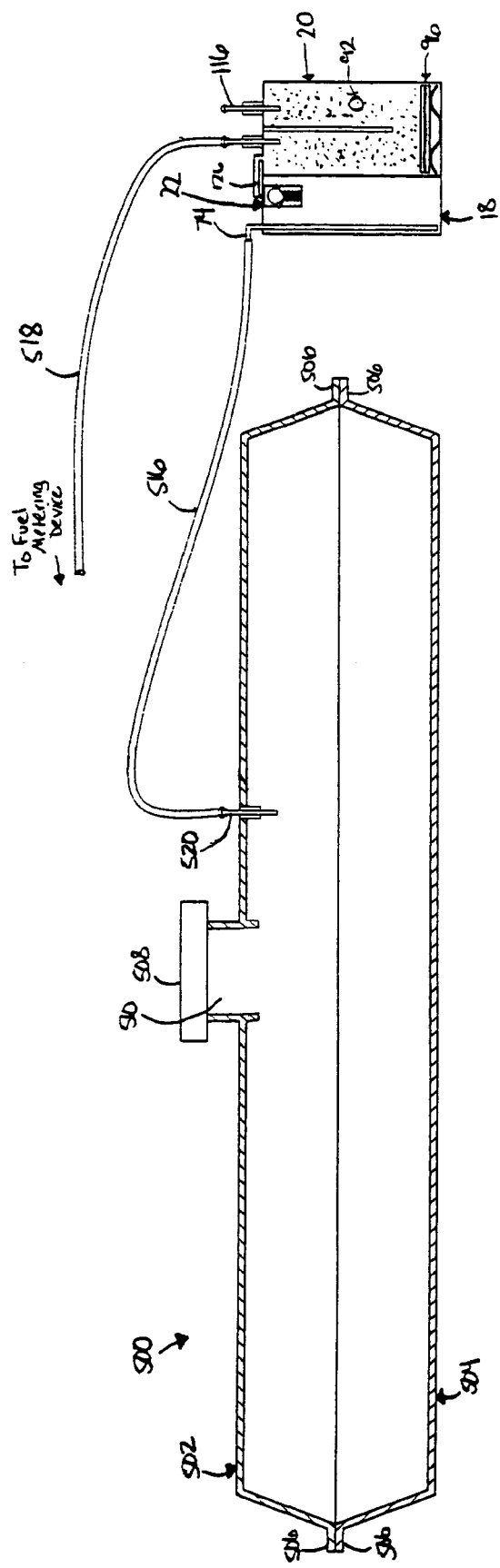
FIG. 10 is an environmental view of a fourth application employing the integrated vapor management system and rollover valve according to various embodiments.

Alternatively, with continued reference to FIGS. 8 and 9, and additional reference to FIG. 10, the overfill chamber 18, hydrocarbon collection chamber 20 and valve assembly 22 may be disposed adjacent to the tank 500 and coupled to the tank 500 via a first hose 516. Although the tank 500 is illustrated in this figure, it will be understood that the fuel tank 16 could be coupled separately to the overfill chamber 18, hydrocarbon collection chamber 20 and valve assembly 22.

The first hose 516 serves to couple the overfill chamber 18 to the tank 500 via a first port 520. The first hose 516 thus enables fuel vapors to exit the tank 500 along with liquid fuel L, and thus the sleeve 509 may be devoid of the opening 511. A second hose 518 may be coupled to the first port 114 of the hydrocarbon collection chamber 20 to provide the fuel metering device 12 with fuel vapors. This embodiment enables the overfill chamber 18, hydrocarbon collection chamber 20 and valve assembly 22 to be coupled to a variety of fuel tanks for use in a variety of applications.

Thus, the fuel system 10 according to the various embodiments of the present invention provides a closed loop fuel system 10 with reduced emissions. In addition, the fuel system 10 is capable of continuously operating, even when tilted at angles less than thirty-five degrees without contaminating the hydrocarbon collection chamber 20 to provide flexibility for use in a variety of applications.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A fuel system comprising:
   a fuel tank having an opening for receipt of a liquid fuel;
   a cap removably coupled to the fuel tank and operable for sealingly closing the opening to prevent ingress and egress of a gaseous fluid through the opening;
   an overfill chamber in communication with the fuel tank for receipt of excess liquid fuel from the fuel tank;
   a hydrocarbon collection chamber in communication with the overfill chamber for receipt of the gaseous fluid; and
   a valve disposed between the hydrocarbon collection chamber and the overfill chamber, the valve having a reference axis;
   wherein the valve includes a housing disposed adjacent to the hydrocarbon collection chamber; at least one stop; at least one plunger operable to contact the at least one stop and positioned relative to the amount of force applied by said at least one stop on the at least one plunger; and at least one sloped surface responsive to the at least one stop to control the amount of force applied to the at least one plunger by the at least one ball stop, wherein the amount of force is dependent upon an angle defined between a vertical axis and the reference axis that is dependent upon the relative positioning of the at least one stop on the at least one sloped surface;
   wherein the valve is configured to prevent liquid communication between the overfill chamber and the hydrocarbon collection chamber when the angle between a the vertical axis and the reference axis is greater than about thirty-five degrees and wherein the valve is configured to allow liquid communication between the overfill chamber and the hydrocarbon collection chamber when the angle between the vertical axis and the reference axis is less than or equal to about thirty-five degrees.

2. The fuel system of claim 1, further comprising:
   a first conduit connecting an upper portion of the fuel tank with a lower portion of the overfill chamber.

3. The fuel system of claim 1, further comprising:
   a second conduit coupled to the hydrocarbon collection chamber, the second conduit being adapted to discharge hydrocarbon vapors to a fuel metering device.

4. The fuel system of claim 1, wherein the hydrocarbon collection chamber, overfill chamber and fuel tank are disposed in a common housing.

5. The fuel system of claim 1, wherein the overfill chamber is sized to prevent the entry of liquid fuel into the hydrocarbon collection chamber when the angle between the vertical axis and the reference axis is less than about thirty-five degrees.

6. The fuel system of claim 1, wherein the opening further comprises at least one molded in feature to protect from the dispensing of excess liquid fuel into the fuel tank.

7. The fuel system of claim 1, wherein the valve further comprises a seal disposed on a surface of the at least one plunger, the seal including at least one flow rib to allow the gaseous fluid to flow between the hydrocarbon collection chamber and the overfill chamber when the at least one plunger restricts the flow of liquid fuel to the hydrocarbon collection chamber.

8. The fuel system of claim 1, wherein the at least one plunger further comprises:
   a base;
   a spring disposed between the base and the housing, the spring responsive to the at least one stop to be compressed by the at least one stop when the angle between the vertical axis and the reference axis is less than about thirty-five degrees; and
   a stem coupled to the base, the stem operable to contact the at least one stop when the angle between the vertical axis and the reference axis is less than about thirty-five degrees to compress the spring.

9. The fuel system of claim 1, wherein the hydrocarbon collection chamber further comprises:
   a housing including a base;
   a hydrocarbon absorption material disposed in the housing;
   at least one spring operable to apply a force to the housing; and
   wherein the base is responsive to the force from the at least one spring to compress the hydrocarbon adsorption material.

10. A fuel system comprising:
a fuel tank having an opening and a fluid discharge line that is adapted to deliver fuel to a fuel metering device;
a cap that is removably coupled to the fuel tank and operable for sealingly closing the opening to prevent ingress and egress of air through the opening;
an overfill chamber in communication with the fuel tank;
a hydrocarbon collection chamber in communication with the overfill chamber;
a valve disposed between the hydrocarbon collection chamber and the overfill chamber;
the valve having a reference axis and including a housing disposed adjacent to the hydrocarbon collection chamber; at least one stop; at least one plunger operable to contact the at least one stop and positioned relative to the amount of force applied by said at least one stop on the at least one plunger; and at least one sloped surface responsive to the at least one stop to control the amount of force applied to the at least one plunger by the at least one ball stop, wherein the amount of force is dependent upon an angle defined between a vertical axis and the reference axis that is dependent upon the relative positioning of the at least one stop on the at least one sloped surface;
wherein the valve is configured to prevent liquid communication between the overfill chamber and the hydrocarbon collection chamber when an angle between the reference axis and a vertical axis exceeds an angle formed by the at least one sloped surface and a horizontal axis and wherein the valve is configured to allow liquid communication between the overfill chamber and the hydrocarbon collection chamber when an angle between the reference axis and a vertical axis does not exceed an angle formed by the at least one sloped surface and a horizontal axis;
a second conduit coupled to the hydrocarbon collection chamber, the second conduit being adapted to discharge hydrocarbon vapors to a fuel metering device; and
wherein fuel discharged from the fluid discharge line causes air to be drawn from the atmosphere through the hydrocarbon collection chamber, the valve and the overfill chamber.

11. The fuel system of claim 10, further comprising:
a first conduit connecting an upper portion of the fuel tank with a lower portion of the overfill chamber to provide fluid communication between the fuel tank and the overfill chamber.

12. The fuel system of claim 10, wherein the hydrocarbon collection chamber, overfill chamber and fuel tank are disposed in a common housing.

13. The fuel system of claim 10, wherein the opening further comprises at least one molded in feature to protect from the dispensing of excess liquid fuel into the fuel tank.

14. The fuel system of claim 10, wherein the angle formed between the at least one sloped surface and the horizontal axis is about thirty-five degrees.

15. The fuel system of claim 10, wherein the overfill chamber is sized to prevent the entry of liquid fuel into the hydrocarbon collection chamber when the angle between the vertical axis and the reference axis is less than about thirty-five degrees.

16. The fuel system of claim 14, wherein the valve further comprises a seal disposed on a surface of the at least one plunger, the seal including at least one flow rib to allow the gaseous fluid to flow between the hydrocarbon collection chamber and the overfill chamber when the at least one plunger restricts the flow of liquid fuel to the hydrocarbon collection chamber.

17. The fuel system of claim 16, wherein the plunger further comprises:
a base;
a spring disposed between the base and the housing, the spring responsive to the at least one stop to be compressed by the at least one stop when the angle between the vertical axis and the reference axis is less than about thirty-five degrees; and
a stem coupled to the base, the stem operable to contact the at least one stop when the angle between the vertical axis and the reference axis is less than about thirty-five degrees to compress the spring.

18. The fuel system of claim 10, wherein the hydrocarbon collection chamber further comprises:
a housing including a base;
a hydrocarbon absorption material disposed in the housing;
at least one spring operable to apply a force to the housing; and
wherein the base is responsive to the force from the at least one spring to compress the hydrocarbon adsorption material.

19. A method for supplying a liquid fuel to a fuel metering device, the fuel metering device operable to apply a suction force to the liquid fuel, comprising:
providing a fuel tank for receipt of the liquid fuel;
flowing fuel vapors from the liquid fuel from the fuel tank into an overfill chamber;
flowing the fuel vapors through a valve, the valve having a reference axis and including a housing disposed adjacent to the hydrocarbon collection chamber; at least one stop; at least one plunger operable to contact the at least one stop and positioned relative to the amount of force applied by said at least one stop on the at least one plunger; and at least one sloped surface responsive to the at least one stop to control the amount of force applied to the at least one plunger by the at least one ball stop, wherein the amount of force is dependent upon an angle defined between a vertical axis and the reference axis that is dependent upon the relative positioning of the at least one stop on the at least one sloped surface;
wherein the valve is configured to prevent liquid communication between the overfill chamber and the hydrocarbon collection chamber when an angle between the reference axis and a vertical axis exceeds a predetermined angle and wherein the valve is configured to allow liquid communication between the overfill chamber and the hydrocarbon collection chamber when an angle between the reference axis and a vertical axis does not exceed the predetermined angle;
flowing the fuel vapors through a hydrocarbon collection chamber; and
flowing air through the hydrocarbon collection chamber, the valve and the overfill chamber about simultaneously with the flowing of the fuel vapors.

20. The method of claim 19, further comprising:
flowing the fuel vapors through a fuel expansion tube from the fuel tank to the overfill chamber; and
flowing liquid fuel into the overfill chamber from the fuel tank.

21. The method of claim 20, further comprising:
preventing the flow of liquid fuel into the hydrocarbon collection chamber when the predetermined angle between the reference axis of the valve and the vertical axis exceeds about thirty-five degrees.

22. The method of claim 20, further comprising:

displacing a ball in the valve when the angle of the reference axis of the valve and the vertical axis exceeds about thirty-five degrees to allow the at least one plunger to move to prevent liquid communication between the overfill chamber and the hydrocarbon collection chamber.

* * * * *